(12) United States Patent
Wolfe et al.

(10) Patent No.: US 10,127,087 B2
(45) Date of Patent: Nov. 13, 2018

(54) CAPACITY BASED DISTRIBUTION OF PROCESSING JOBS TO COMPUTING COMPONENTS

(71) Applicants: Adriane Q. Wolfe, San Diego, CA (US); David B. Chadwick, San Diego, CA (US); Daniel Grady, San Diego, CA (US)

(72) Inventors: Adriane Q. Wolfe, San Diego, CA (US); David B. Chadwick, San Diego, CA (US); Daniel Grady, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 115 days.

(21) Appl. No.: 15/334,340

(22) Filed: Oct. 26, 2016

(65) Prior Publication Data
US 2018/0113751 A1    Apr. 26, 2018

(51) Int. Cl.
*G06F 9/46*    (2006.01)
*G06F 9/50*    (2006.01)
*G06F 1/20*    (2006.01)

(52) U.S. Cl.
CPC .......... *G06F 9/5094* (2013.01); *G06F 1/206* (2013.01); *G06F 2209/506* (2013.01)

(58) Field of Classification Search
CPC .................... G06F 9/5094; G06F 2209/506
See application file for complete search history.

(56) References Cited

U.S. PATENT DOCUMENTS

| | | | | |
|---|---|---|---|---|
| 3,593,300 A | * | 7/1971 | Driscoll, Jr. | ............ G06F 9/468 718/104 |
| 9,933,825 B2 | * | 4/2018 | Hanumaiah | ............. G06F 1/206 |
| 2016/0273848 A1 | * | 9/2016 | Dede | ........................ F28F 13/00 |

* cited by examiner

*Primary Examiner* — Camquy Truong
(74) *Attorney, Agent, or Firm* — SPAWAR Systems Center Pacific; Kyle Eppele

(57) ABSTRACT

A system, method, and computer program product are provided for identifying a plurality of components of a computing system, determining a power flow and a heat flow between the plurality of components, creating a plurality of system matrices, utilizing the power flow and the heat flow, creating a plurality of system vectors, utilizing information derived from the plurality of components, and distributing a plurality of processing jobs to one or more of the plurality of components of the computing system according to one or more constraints, utilizing the plurality of system vectors and the plurality of system matrices.

20 Claims, 4 Drawing Sheets

CAPACITY BASED DISTRIBUTION OF PROCESSING JOBS TO COMPUTING COMPONENTS

FEDERALLY-SPONSORED RESEARCH AND DEVELOPMENT

The United States Government has ownership rights in this invention. Licensing inquiries may be directed to the Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 103046.

BACKGROUND OF THE INVENTION

Field of Invention

This disclosure relates to computing systems management, and more specifically, this disclosure relates to analyzing power requirements given a computing load.

Description of Related Art

Centralized computing systems (e.g., data centers, military command-and-control systems, etc.) have various operating concerns, including how much electric power it takes to power the system, and how much heat the various system components generate. Because servers may fail if they become too hot, the heat generated by these computing systems may be actively cooled, which in turn may require electric power. Often these systems are designed with a significant buffer in their listed specifications, which means that they are normally operated in an under-utilized and inefficient fashion.

BRIEF SUMMARY OF INVENTION

The present disclosure addresses the needs noted above by providing a system, method, and computer program product for identifying a plurality of components of a computing system, determining a power flow and a heat flow between the plurality of components, creating a plurality of system vectors, utilizing the plurality of components, creating a plurality of system matrices, utilizing the power flow and the heat flow, and distributing a plurality of processing jobs to one or more of the plurality of components of the computing system according to one or more constraints, utilizing the plurality of system vectors and the plurality of system matrices.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the invention. In the drawings.

DETAILED DESCRIPTION OF THE INVENTION

Figure 1:
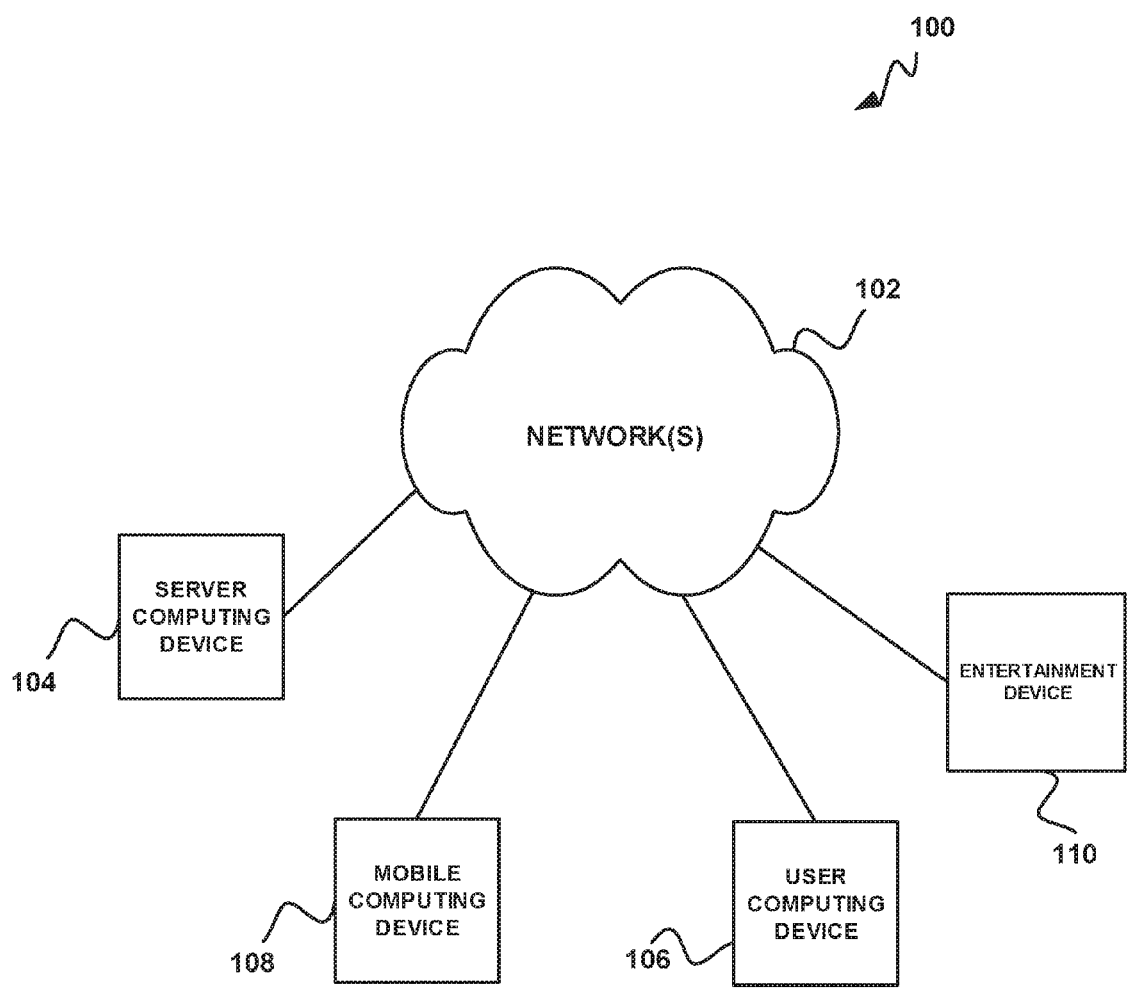
FIG. 1 illustrates a prior art network communication architecture, according to one embodiment.

FIG. 1 illustrates a prior art network communication architecture 100, in accordance with one exemplary embodiment. As shown, the network communication architecture 100 includes at least one network 102. In the context of the network communication architecture 100, the at least one network 102 may take any form including, but not limited to a local area network (LAN), a wireless network, a wide area network (WAN) (e.g., the Internet, etc.), a peer-to-peer network, a cable network, a telecommunications network, etc. While only one network 102 is shown, it should be understood that a plurality of similar or different networks 102 may be provided.

Communicatively coupled to the network 102 is a plurality of devices. For example, a server computing device 104 and a user computing device 106 may be coupled to the network 102 for communication purposes. Such user computing device 106 may include a desktop computer, a terminal console, etc. Still yet, various other devices may be coupled to the network 102 including a mobile computing device 108 (e.g., a tablet and/or handheld computer, a mobile phone device, a laptop computer, etc.), and an entertainment device 110 (e.g., a video game console, a digital video recorder (DVR), a media streaming device, a television, etc.).

Figure 2:
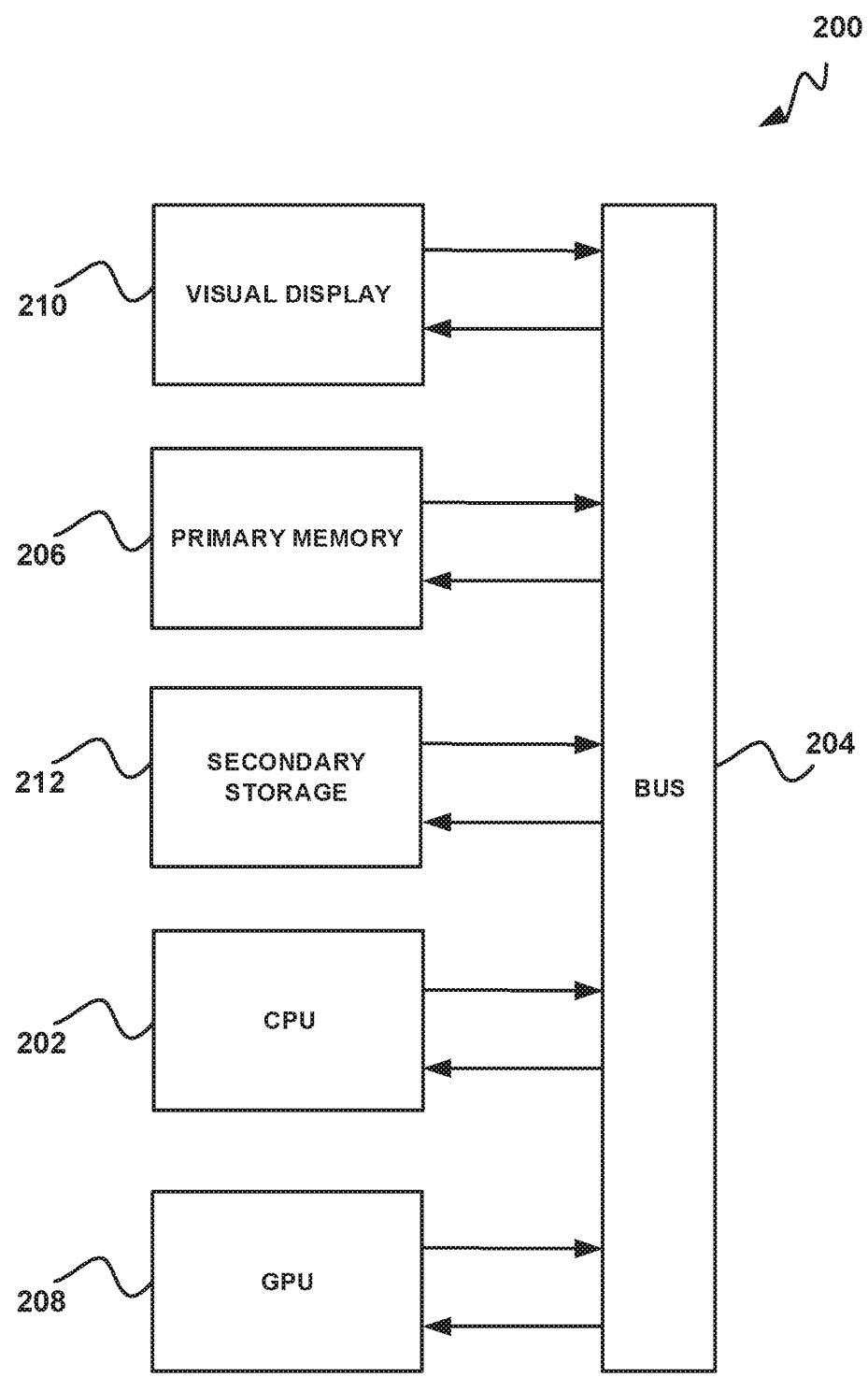
FIG. 2 illustrates an exemplary prior art computing system, according to another embodiment.

FIG. 2 illustrates an exemplary prior art computing system 200, in accordance with one embodiment. As an option, the computing system 200 may be implemented in the context of any of the devices 104-110 of the network communication architecture 100 of FIG. 1. Of course, the computing system 200 may be implemented in any desired environment.

As shown, the exemplary computing system 200 includes at least one central processing unit (CPU) 202 which is connected to a system communication bus 204. The exemplary computing system 200 also includes primary memory 206 (e.g. one or more random access memory (RAM) modules, etc.). The exemplary computing system 200 also includes a graphics processing unit (GPU) 208 and a visual display 210 (e.g., a computer monitor, etc.).

The exemplary computing system 200 also includes a secondary storage module 212. The secondary storage module 212 may include, for example, one or more of a hard disk drive, a removable storage drive, etc. In one embodiment, computer programs, or computer control logic algorithms, may be stored in the primary memory 206, the secondary storage module 212, or in memory remote from the computing system 200. Such computer programs, when executed, may enable the exemplary computing system 200 to perform one or more functions (e.g., set forth herein). Primary memory 206, secondary storage module 212, volatile or non-volatile storage, and/or any other type of storage are possible examples of non-transitory computer-readable media.

Figure 3:
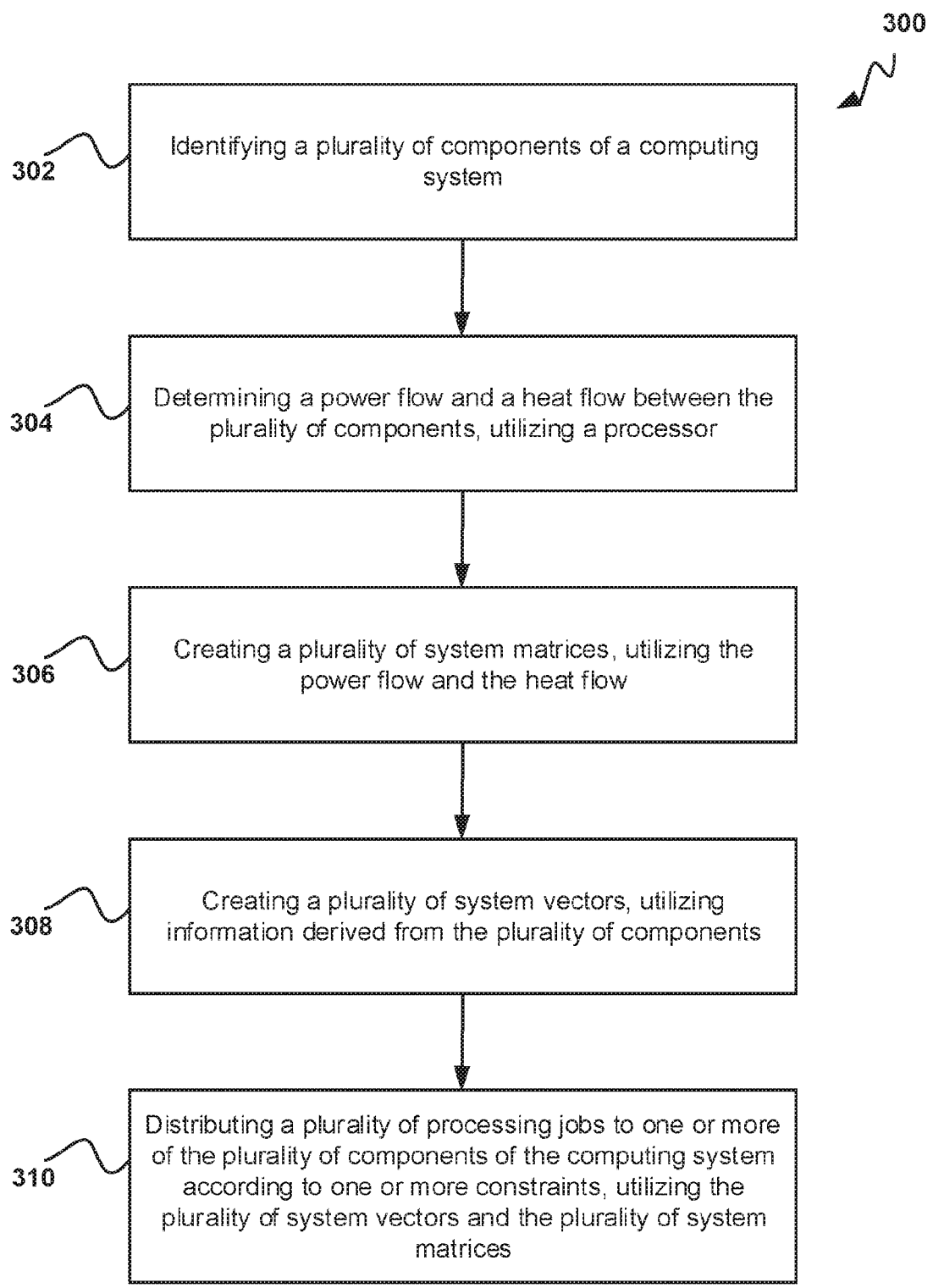
FIG. 3 illustrates a method for distributing processing jobs to computing components, according to several embodiments of the present invention; and, FIG. 4 illustrates an exemplary system diagram, according to another embodiment.

FIG. 3 illustrates a method 300 for capacity based distribution of processing jobs to computing components, in accordance with one embodiment. As an option, the method 300 may be carried out in the context of the details of FIGS. 1, 2, and/or 4. Of course, however, the method 300 may be carried out in any desired environment. Further, the aforementioned definitions may equally apply to the description below.

As shown in operation 302, a plurality of components of a computing system (such as components 402-416 of system diagram 400, etc.) are identified. In one embodiment, the computing system may include one or more of a server system, a data storage system, a command and control system, etc. In another embodiment, the plurality of components may include one or more of server computers, server modules, power distribution units (PDUs), temperature control modules (e.g., air conditioners, etc.), etc.

Additionally, as shown in operation 304, a power flow and a heat flow are determined between the plurality of components. In one embodiment, the power flow may indicate one or more flows of power (e.g., electricity, etc.), where each power flow originates at one of the plurality of components and moves to another of the plurality of components. In another embodiment, the heat flow may indicate one or more flows of heat (e.g., heat energy, etc.), where each heat flow originates at one of the plurality of components and moves to another of the plurality of components.

Further, in one embodiment, determining the power flow and the heat flow between the plurality of components may include creating a relationship diagram between the plurality of components. For example, the relationship diagram such as a system diagram may graphically and logically indicate the power flow and the heat flow between the plurality of components.

Further still, as shown in operation 306, a plurality of system matrices are created, utilizing the power flow and the heat flow. In one embodiment, the plurality of system matrices may include a heat transfer matrix. For example, the heat transfer matrix may indicate one or more of the plurality of components that are cooled within the system, one or more of the plurality of components that perform cooling within the system, etc. In another embodiment, the plurality of system matrices may include an electricity transfer matrix. For example, the electricity transfer matrix may indicate one or more of the plurality of components that use power within system, one or more of the plurality of components that provide power within the system, etc.

Also, as shown in operation 308, a plurality of system vectors are created, utilizing information derived from the plurality of components. In one embodiment, each of the plurality of system vectors may include a capacity vector that is derived from a provided design of a component. For example, the plurality of system vectors may include a vector indicating a maximum power output each of the plurality of components is able to produce. In another example, the plurality of system vectors may include a vector indicating a maximum cooling capacity for each of the plurality of components (e.g., an amount of heat that each of the components is able to cool, etc.).

In addition, the plurality of system vectors may include one or more operating vectors that are determined by an amount and/or an arrangement of work and operating conditions of other components in the system. For example, the plurality of system vectors may include a vector indicating an amount of electric power required by each of the components. In another example, the plurality of system vectors may include a vector indicating an amount of heat output by each of the plurality of components.

Furthermore, as shown in operation 310, a plurality of processing jobs are distributed to one or more of the plurality of components of the computing system according to one or more constraints, utilizing the plurality of system vectors and the plurality of system matrices. In one embodiment, each of the plurality of processing jobs may include processing work that is to be performed within the system (e.g., by one or more of the plurality of components of the computing system, etc.). For example, the processing jobs may include queued work such as the running of one or more programs within the computing system, the accessing and manipulation of data within the computing system, etc.

Further still, in one embodiment, distributing the plurality of processing jobs may include determining an assignment of processing jobs to each of the plurality of components within the system according to the one or more constraints. For example, the one or more constraints may include a capacity constraint created utilizing one or more of the plurality of system vectors. For instance, the capacity constraint may require that processing jobs assigned to one of the plurality of components may not exceed a central processing unit (CPU) capacity of the component.

Also, in one embodiment, the one or more constraints may include a heat constraint created utilizing one or more of the plurality of system vectors and the heat transfer matrix. For example, the heat constraint may require that a heat amount that is to be cooled by a cooling component may not exceed a cooling capacity of the component. In another embodiment, the one or more constraints may include a power constraint created utilizing one or more of the plurality of system vectors and the electricity transfer matrix. For example, the power constraint may require that a power output required of each of the plurality of components may not exceed the power capacity of the component.

In this way, a framework may be provided for arranging computing jobs onto components of the computing system, based on measurements and functional dependencies of components within the computing system.

Figure 4:
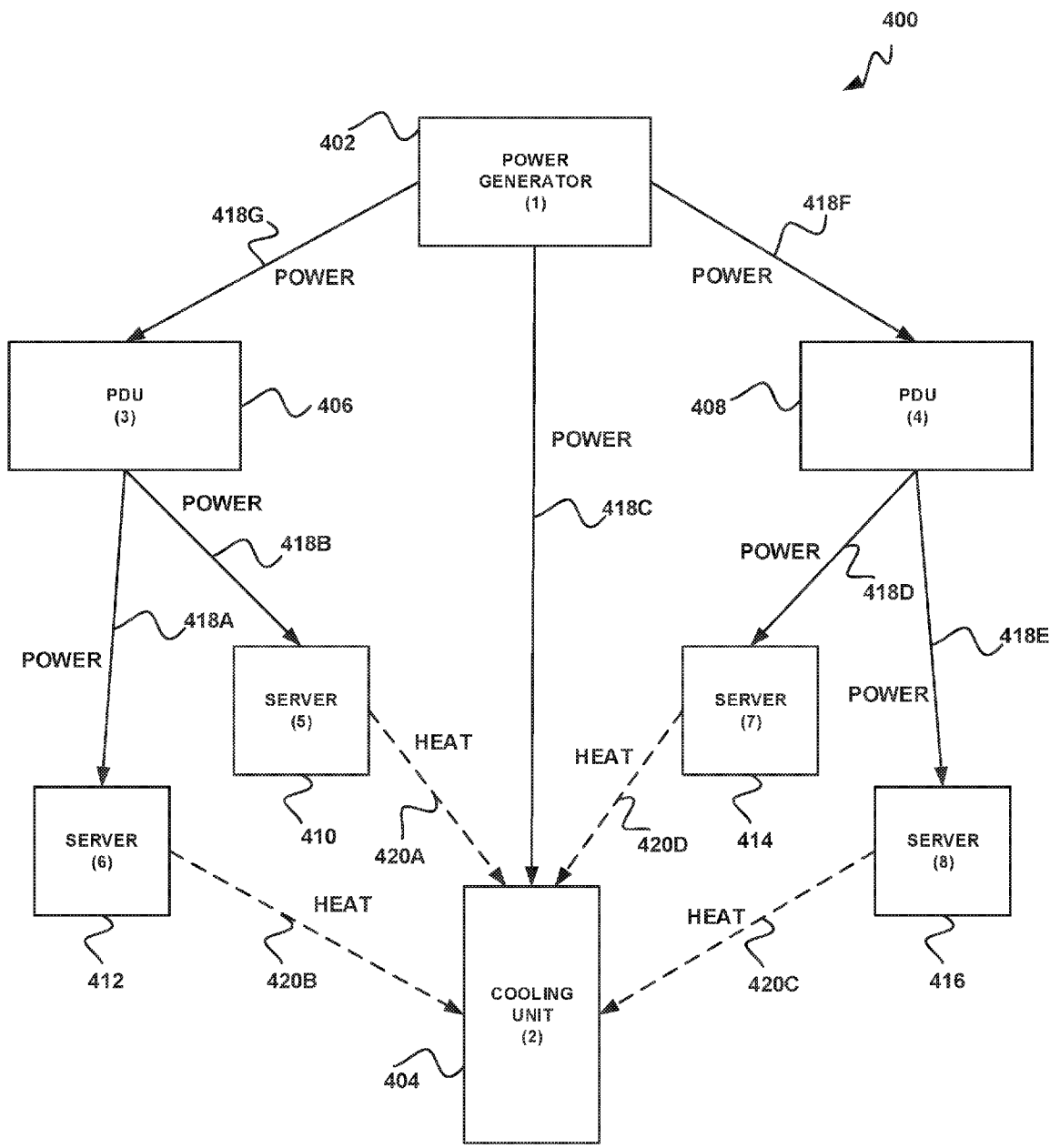

FIG. 4 illustrates a system diagram 400, in accordance with one exemplary embodiment. As an option, the system diagram 400 may be carried out in the context of the details of FIGS. 1-3. Of course, however, the system diagram 400 may be carried out in any desired environment. Further, the aforementioned definitions may equally apply to the description below.

In one embodiment, the system diagram 400 may describe a layout of a computing system. Also, the system diagram 400 includes a plurality of system components 402-416. Included are a power generator 402, a cooling unit 404, power distribution units (PDUs) 406 and 408, and servers 410-416. Additionally, the system diagram 400 further includes a plurality of electric power flows 418A-G and a plurality of heat flows 420A-D.

Additionally, in one embodiment, the power distribution units 406 and 408 may include one or more of rack power distribution units, power buses, breakers, switches, etc. In another embodiment, the power generator 402 may include one or more of renewable power generation from photovoltaic cells, uninterruptable power supplies or other batteries, backup generators, power storage, electric grid connections, etc. In yet another embodiment, the cooling unit 404 may include one or more of an air conditioning unit, a liquid cooling unit, etc.

Further, in one embodiment, the system diagram 400 may be constructed by analyzing a physical arrangement of components within an existing system. In another embodiment, the system diagram 400 may capture hard power and cooling capacities based on the capabilities of the system components 402-416, as well as the connections between components in the form of the plurality of electric power flows 418A-G and the plurality of heat flows 420A-D.

Further still, in one embodiment, the system diagram 400 may graphically associate the power and cooling relationships between the system components 402-416, including both electric flows (which components are responsible for powering other components) and heat flows (which components are responsible for cooling other components). In another embodiment, the plurality of heat flows 420A-D may only capture heat flows that are actively cooled.

Also, in one embodiment, capacity information about each of the plurality of system components 402-416 may be recorded. For example, for each component i, a maximum power output capacity $t_i$ may be determined that may measure (e.g., in watts, etc.) the total amount of electric power that component i is able to produce. In another example, for each component i, a maximum cooling capacity $c_i$ may measure (e.g., in watts, etc.) a total amount of heat that component i is able to actively cool. These may constitute capacity constraints for component i, and may be distinguished from operating conditions for component i, which may be measured by $p_i$, the electric power required by component i, and $h_i$, a heat dissipation output by component i.

In addition, in one embodiment, the capacity constraints $t_i$ and $c_i$ for each of the plurality of system components 402-416 may be determined by a design each of the plurality of system components 402-416. In another embodiment, the operating conditions $p_i$ and $h_i$ may be determined by an amount and arrangement of the work being done by the computing system in the system diagram 400 as well as the operating conditions of the plurality of system components 402-416 in the system diagram 400.

Table 1 illustrates exemplary capacity constraints $t_i$ and $c_i$ and exemplary operating conditions $p_i$ and $h_i$ associated with the system components 402-416 of the system diagram 400. Of course, it should be noted that the constraints and operating conditions shown in Table 1 are set forth for illustrative purposes only, and thus should not be construed as limiting in any manner.

TABLE 1

| 402 (1) | 404 (2) | 406 (3) | 408 (4) | 410 (5) | 412 (6) | 416 (7) | 418 (8) |
|---|---|---|---|---|---|---|---|
| t | 1 kW | 0 | 500 W | 500 W | 0 | 0 | 0 | 0 |
| c | 0 | 500 W | 0 | 0 | 0 | 0 | 0 | 0 |
| p | 0 | 500 W | 400 W | 350 W | 200 W | 200 W | 200 W | 150 W |
| h | 0 | 0 | 0 | 0 | 10 W | 10 W | 10 W | 7 W |

Furthermore, in one embodiment, a list of jobs or computational tasks $j_k$ that the system must perform may be determined. For example, each job/computational task may be represented as a number $j_k \in [0,1]$ that may measure a fraction of a computer's CPU required to run the job. In another example, an arrangement of jobs on computers may then be determined which may satisfy the capacity constraints $t_i$ and $c_i$. For instance, let C be the set of component numbers that correspond to servers 410-416, and let $r_k \in C$ be the component number which is responsible for running job k. One exemplary goal may be to find a set of values for all $r_k$ which may satisfy the capacity constraints $t_i$ and $c_i$. This may be cast as a constraint-satisfaction problem, which may then be solved using one or more algorithms.

Further still, in one embodiment, one constraint that may need to be satisfied is that each computer may not be assigned more than 100% capacity. See Equation (1) for an exemplary constraint:

$$R_{ik} = \begin{cases} 1 \text{ if job } k \text{ is assigned to component } i \\ 0 \text{ otherwise} \end{cases} \quad (1)$$

As shown in Equation (1), the job assignment matrix $R_{ik}$ may be set to 1 if job k is assigned to component i, and may be set to 0 if not. In another example, the component utilization vector $u = R \cdot j$. In another example, the entries of u may give a fraction of a CPU which is utilized on each of the system components 402-416 (which may be zero for any component that is not one of servers 410-416), and components of j may include the job requirements $j_k$. In another embodiment, one constraint that may need to be satisfied may include $u \leq 1$.

Also, in one embodiment, each of the system components 402-416 may be characterized by four numbers: $t_k$, $c_k$, $p_k$, and $h_k$. In another embodiment, the capacity constraints $t_k$ and $c_k$ may be fixed, and the operating conditions $p_k$ and $h_k$ may depend on $u_k$ as well as the operating conditions of other system components 402-416. As a result, for system vectors t, c, p, and h, heat output may be considered to be a function of component CPU utilization and power input may be considered to be a function of CPU utilization and heat output of other devices. These may be determined based on a predetermined model of heat flow and power utilization.

Additionally, in one embodiment, to derive remaining constraint equations, two additional matrices may be defined. For example, see Equation (2) for an exemplary heat transfer matrix $H_{ij}$, and see Equation (3) for an exemplary electricity transfer matrix $E_{ij}$:

$$H_{ij} = \begin{cases} 1 \text{ if the heat produced by a} \\ \text{component } i \text{ is actively cooled by component } j \\ 0 \text{ otherwise} \end{cases} \quad (2)$$

$$E_{ij} = \begin{cases} 1 \text{ if component } i \text{ provides} \\ \text{electric power to component } j \\ 0 \text{ otherwise} \end{cases} \quad (3)$$

As shown in Equation (2), a heat transfer matrix $H_{ij}$ may equal 1 if the heat produced by a component i is actively cooled by component j, and $H_{ij}$ may equal 0 if the heat produced by a component i is not actively cooled by component j. As shown in Equation (3), an electricity transfer matrix $E_{ij}$ may equal 1 if component i provides electric power to component j, and the electricity transfer matrix $E_{ij}$ may equal 0 if component i does not provide electric power to component j.

Further, in one embodiment, given these matrices, constraints may be defined as concise matrix equations. In Equation (4), for example:

$$R \cdot j \leq 1 \quad (4)$$

As shown in Equation (4), the jobs assigned to a component may not exceed that component's CPU capacity. In another example, Equation (5):

$$H^T \cdot h(u) \leq c \quad (5)$$

As shown in Equation (5), the heat flux that may be actively cooled by a component may not exceed that component's cooling capacity. In yet another example, Equation (6):

$$E \cdot p(u, h) \leq t \quad (6)$$

As shown in Equation (6), the power output required of each component may not exceed that component's power capacity.

Further still, in one embodiment, to apply this methodology, a constraint-satisfaction algorithm may be used to find values for the job assignment variables $r_k$ that satisfy all the constraints of the system diagram 400. Although the constraint-satisfaction problem may be solved for a long-term steady state of the computing system, the problem may be reevaluated whenever job requirements or capacity constraints change and thus may be applied dynamically as well.

Additionally, in one embodiment, an exemplary heat transfer matrix H and electricity transfer matrix E may be created from the system diagram 400, utilizing data in the order shown in Table 1. For example, in the exemplary heat transfer matrix H, each matrix value may represent a pair of system components 402-416 within the system diagram 400, and may identify whether heat is transferred between the pair of system components 402-416. In another example, in the exemplary electricity transfer matrix E, each matrix value may represent a pair of system components 402-416 within the system diagram 400, and may identify whether electricity is transferred between the pair of system components 402-416.

An exemplary heat transfer matrix H and an exemplary electricity transfer matrix E are shown below:

$$H = \begin{bmatrix} 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 1 & 0 & 0 & 0 & 0 & 0 & 0 \\ 0 & 1 & 0 & 0 & 0 & 0 & 0 & 0 \\ 0 & 1 & 0 & 0 & 0 & 0 & 0 & 0 \\ 0 & 1 & 0 & 0 & 0 & 0 & 0 & 0 \end{bmatrix} \text{ and } E = \begin{bmatrix} 0 & 1 & 1 & 1 & 0 & 0 & 0 & 0 \\ 0 & 0 & 0 & 0 & 0 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

For example, H[5,2] (e.g., the fifth row, second column of matrix H) may have a value of 1 to indicate that there is a heat transfer between the second component listed in Table 1/the system diagram 400 (cooling unit 404) and the fifth component listed in the Table 1/system diagram 400 (server 410). Likewise, E[1,2] (e.g., the first row, second column of matrix E) may have a value of 1 to indicate that there is a heat transfer between the second component listed in Table 1/the system diagram 400 (cooling unit 404) and the first component listed in the Table 1/system diagram 400 (power generator 402).

Also, in one embodiment, vectors t and c may be given by the corresponding rows in Table 1. For example, using the exemplary data from Table 1, vectors t and c are shown below:

t=[1 kW 0 500 W 500 W 0 0 0 0]

c=[0 500 W 0 0 0 0 0 0]

In another embodiment, some exemplary assumptions may be made with respect to system components 402-416 within the system diagram 400. For example, it may be assumed, utilizing synthetic data for simulation, that the power generator 402, cooling unit 404, and power distribution units 406 and 408 do not produce heat that is to be actively cooled, and that the heat produced by each of the servers 410-416 is proportional to u, as shown in Equation (7):

$$h_k = \begin{cases} 5 + 5u_k & \text{for } k = 5, 6, 7, 8 \\ 0 & \text{otherwise} \end{cases} \tag{7}$$

In yet another embodiment, it may be assumed that the power requirement p of the cooling unit 404 is proportional to the total input heat, as shown in Equation (8):

$$p \propto h_{total} \tag{8}$$

It still another embodiment, it may be assumed that the power requirements of each of the servers 410-416 are proportional to u, as shown in Equation (9):

$$p_k \propto u \text{ for } k=5,6,7,8 \tag{9}$$

In addition, in one example utilizing synthetic data for simulation, the system outlined in the system diagram 400 may be required to run seven jobs requiring respectively u=(0.25, 0.5, 0.15, 0.5, 0.9, 0.75, 0.3), where u indicates a required percentage of a server's CPU capacity. Beginning with a randomized approximation for job assignment variables $r_k$, a constraint satisfaction algorithm may be applied to vectors t and c as well as matrices H and E that accounts for matrix equation constraints to arrive at an allowed arrangement of jobs to each of the servers 410-416.

In this way, a constraint-based approach may be implemented for management of a computing system. In one embodiment, the approach may be adjusted in one or more ways. For example, the method for determining how heat power and electric power depend on CPU utilization and heat outputs may include an engineering model. In another example, the method may include one or more experimental measurements that may be carried out ahead of time on the computing system. In yet another example, the method may be based on an ongoing feedback or machine learning process that may monitor the computing system as it is running and may adjust the functional forms of h and p based on the monitoring. These heat and power relationships may also be component-specific.

Further, in one embodiment, the methodology may look for any feasible arrangement of jobs. In another embodiment, the methodology may be extended by adding an optimization condition, which may result in a constrained optimization problem. In yet another embodiment, a quantity to be optimized may depend on one or more factors (e.g., the goals of the computing system designer, the goals of one or more users of the system, current operating conditions, etc.).

For example, some of the quantities that may be optimized include one or more of performance or latency (e.g., responding to job demands as quickly as possible, etc.), power usage (e.g., minimizing the total amount of power consumed, etc.), service level violations (e.g., maintaining a given degree of system uptime, etc.), job swapping (e.g., minimizing the number of jobs that are reallocated when a new job is added to the system, etc.), active cooling (e.g., minimizing the total heat that must be actively dissipated, etc.), etc.

Further still, in one embodiment, different goals may take precedence at different times. For example, when a system is attempting to run off of renewable power without activating a backup generator, power usage and active cooling may be prioritized at the expense of performance. In another embodiment, one or more constraints may be relaxed. For example, a threshold frequency of dropped requests or a threshold period of time during which not all heat generated is actively cooled may be tolerated.

In this way, the methodology may account for system capacity constraints from the perspective of server utilization, power distribution, and cooling requirements by converting all of these factors into power capacity. All the characteristics of each component of a system may be approximated based on power costs; by taking this power based approach, a common unit may be obtained for calculating capacity and efficiency.

By measuring or estimating these costs up front and embodying them in a system diagram, it is able to be determined how a given job load may affect a computing system, and workloads may be allocated appropriately, which may result in higher reliability and fewer service violations. The performance of a computing system that operates in an energy-constrained environment may be optimized by providing a methodology to efficiently determine if a given computational load may be executed based on system capacity constraints for distributing electricity and providing cooling.

It will be understood that many additional changes in the details, materials, steps and arrangement of parts, which have been herein described and illustrated to explain the nature of the invention, may be made by those skilled in the art within the principle and scope of the invention as expressed in the appended claims.

The foregoing descriptions of various embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. A computer program embodied on a tangible computer readable medium, comprising:
    computer code for identifying a plurality of components of a computing system;
    computer code for determining a power flow and a heat flow between the plurality of components;
    computer code for creating a plurality of system matrices, utilizing the power flow and the heat flow, wherein said plurality of system matrices indicate, for at least one of the plurality of components of the computing system, at least one of (1) whether the at least one of the plurality of components of the computing system is cooled in the computing system, (2) whether the at least one of the plurality of components of the computing system performs cooling in the computing system, (3) whether the at least one of the plurality of components of the computing system uses power in the computing system, and (4) whether the at least one of the plurality of components of the computing system provides power in the computing system;
    computer code for creating a plurality of system vectors, utilizing information derived from the plurality of components; and
    computer code for distributing a plurality of processing jobs to one or more of the plurality of components of the computing system according to one or more constraints, utilizing the plurality of system vectors and the plurality of system matrices.

2. The computer program of claim 1, wherein the plurality of components includes one or more of server computers, server modules, power distribution units (PDUs), and temperature control modules such that at least one component in the plurality of components has a maximum power output capacity quantity, at least one component in the plurality of components has a maximum cooling capacity quantity, at least one component in the plurality of components has a electric power required quantity, and at least one component in the plurality of components has a heat dissipation output quantity.

3. The computer program of claim 1, wherein:
    the power flow indicates one or more flows of electricity, where each power flow originates at one of the plurality of components and moves to another of the plurality of components; and
    the heat flow indicates one or more flows of heat energy, where each heat flow originates at one of the plurality of components and moves to another of the plurality of components.

4. The computer program of claim 1, wherein the plurality of system vectors includes a first vector indicating a maximum power output each of the plurality of components is able to produce.

5. The computer program of claim 1, wherein the plurality of system vectors may include a second vector indicating a maximum cooling capacity for each of the plurality of components.

6. The computer program of claim 1, wherein the plurality of system vectors includes a third vector indicating an amount of electric power required by each of the plurality of components, and a fourth vector indicating an amount of heat output by each of the plurality of components.

7. The computer program of claim 1, wherein the plurality of system matrices includes a heat transfer matrix and an electricity transfer matrix.

8. The computer program of claim 1, wherein the one or more constraints include a capacity constraint created utilizing one or more of the plurality of system vectors.

9. The computer program of claim 1, wherein the one or more constraints include a heat constraint created utilizing one or more of the plurality of system vectors and a heat transfer matrix.

10. The computer program of claim 1, wherein the one or more constraints include a power constraint created utilizing one or more of the plurality of system vectors and an electricity transfer matrix.

11. A method, comprising:
    identifying a plurality of components of a computing system;
    determining a power flow and a heat flow between the plurality of components, utilizing a processor;
    creating a plurality of system matrices, utilizing the power flow and the heat flow wherein said plurality of system matrices indicate, for at least one of the plurality of components of the computing system, at least one of (1) whether the at least one of the plurality of components of the computing system is cooled in the computing system, (2) whether the at least one of the plurality of components of the computing system performs cooling in the computing system, (3) whether the at least one of the plurality of components of the computing system uses power in the computing system, and (4) whether the at least one of the plurality of components of the computing system provides power in the computing system;
    creating a plurality of system vectors, utilizing information derived from the plurality of components; and
    distributing a plurality of processing jobs to one or more of the plurality of components of the computing system according to one or more constraints, utilizing the plurality of system vectors and the plurality of system matrices.

12. The method of claim 11, wherein the plurality of components includes one or more of server computers, server modules, power distribution units (PDUs), and temperature control modules such that at least one component in the plurality of components has a maximum power output capacity quantity, at least one component in the plurality of components has a maximum cooling capacity quantity, at least one component in the plurality of components has a electric power required quantity, and at least one component in the plurality of components has a heat dissipation output quantity.

13. The method of claim 11, wherein:
the power flow indicates one or more flows of electricity, where each power flow originates at one of the plurality of components and moves to another of the plurality of components; and
the heat flow indicates one or more flows of heat energy, where each heat flow originates at one of the plurality of components and moves to another of the plurality of components.

14. The method of claim 11, wherein the plurality of system vectors includes a first vector indicating a maximum power output each of the plurality of components is able to produce.

15. The method of claim 11, wherein the plurality of system vectors may include a second vector indicating a maximum cooling capacity for each of the plurality of components.

16. The method of claim 11, wherein the plurality of system vectors includes a third vector indicating an amount of electric power required by each of the plurality of components, and a fourth vector indicating an amount of heat output by each of the plurality of components.

17. The method of claim 11, wherein the plurality of system matrices includes a heat transfer matrix and an electricity transfer matrix.

18. The method of claim 11, wherein the one or more constraints include a capacity constraint created utilizing one or more of the plurality of system vectors.

19. The method of claim 11, wherein the one or more constraints include a heat constraint created utilizing one or more of the plurality of system vectors and a heat transfer matrix.

20. A system, comprising:
a processor for:
identifying a plurality of components of a computing system, wherein at least one component in the plurality of components has a maximum power output capacity quantity, at least one component in the plurality of components has a maximum cooling capacity quantity, at least one component in the plurality of components has electric power required quantity, and at least one component in the plurality of components has heat dissipation output quantity;
determining a power flow and a heat flow between the plurality of components;
creating a plurality of system matrices, utilizing the power flow and the heat flow, wherein said plurality of system matrices indicate, for at least one of the plurality of components of the computing system, at least one of (1) whether the at least one of the plurality of components of the computing system is cooled in the computing system, (2) whether the at least one of the plurality of components of the computing system performs cooling in the computing system, (3) whether the at least one of the plurality of components of the computing system uses power in the computing system, and (4) whether the at least one of the plurality of components of the computing system provides power in the computing system;
creating a plurality of system vectors, utilizing information derived from the plurality of components; and
distributing a plurality of processing jobs to one or more of the plurality of components of the computing system according to one or more constraints, utilizing the plurality of system vectors and the plurality of system matrices.

* * * * *